United States Patent
Tran et al.

(10) Patent No.: US 10,107,717 B2
(45) Date of Patent: Oct. 23, 2018

(54) TEST BENCH FOR AN AXIAL TURBINE ENGINE WITH A VERTICAL WIND POWER ENGINE

(71) Applicant: Techspace Aero S.A., Herstal (BE)

(72) Inventors: Quac Hung Tran, Liege (BE); Benoit Meys, Fexe-le-Haut-Clocher (BE); Alain Lacroix, Anthisnes (BE)

(73) Assignee: Safran Aero Boosters SA (BE)

( * ) Notice: Subject to any disclaimer, the term of this patent is extended or adjusted under 35 U.S.C. 154(b) by 149 days.

(21) Appl. No.: 14/943,556

(22) Filed: Nov. 17, 2015

(65) Prior Publication Data
US 2016/0139001 A1     May 19, 2016

(30) Foreign Application Priority Data

Nov. 17, 2014    (BE) .................................. 2014/0822

(51) Int. Cl.
| | |
|---|---|
| *G01M 15/14* | (2006.01) |
| *F01D 15/10* | (2006.01) |
| *F01D 21/00* | (2006.01) |
| *F02C 7/20* | (2006.01) |

(52) U.S. Cl.
CPC ............ *G01M 15/14* (2013.01); *F01D 15/10* (2013.01); *F01D 21/003* (2013.01); *F02C 7/20* (2013.01); *F05B 2220/602* (2013.01)

(58) Field of Classification Search
CPC ......... G01M 15/14; F01D 15/08; F01D 15/10
See application file for complete search history.

(56) References Cited

U.S. PATENT DOCUMENTS

| | | | | |
|---|---|---|---|---|
| 6,717,282 B1* | 4/2004 | Maxwell | ................. | F02N 11/04 290/40 B |
| 8,454,313 B2* | 6/2013 | Elkin | ...................... | F03D 1/025 416/132 B |
| 8,941,256 B1* | 1/2015 | Czamara | ................... | F03D 9/00 290/55 |
| 9,080,551 B2* | 7/2015 | Yudkovitz | ............ | F03D 1/0608 |

(Continued)

FOREIGN PATENT DOCUMENTS

| | | |
|---|---|---|
| EP | 2336507 A1 | 6/2011 |
| JP | H1019737 A | 1/1998 |
| WO | 2012171105 A1 | 12/2012 |

OTHER PUBLICATIONS

European Search Report from corresponding Belgium Application No. BE 201400822, dated Jul. 8, 2015.

*Primary Examiner* — Lisa Caputo
*Assistant Examiner* — Herbert K Roberts
(74) *Attorney, Agent, or Firm* — Sandberg Phoenix & von Gontard P.C.

(57) ABSTRACT

The invention relates to a test bench for an axial turbine engine, especially for a turbojet, including: a chamber intended to accommodate the turbine engine; a vertical inlet channel connected to the chamber upstream of the turbine engine; and a vertical outlet channel connected to the chamber downstream of the turbine engine; at least one wind power engine capable of converting the kinetic energy of a portion of the gas stream generated by the turbine engine into mechanical energy; the wind power engine or at least one of the wind power engines is situated in the vertical inlet channel and/or the vertical outlet channel. The invention also relates to a process for recovering energy of such a test bench.

14 Claims, 2 Drawing Sheets

(56) References Cited

U.S. PATENT DOCUMENTS

| | | | |
|---|---|---|---|
| 9,133,733 B2* | 9/2015 | Zitouni | F01D 25/30 |
| 2005/0082839 A1* | 4/2005 | McCoin | F03D 1/025 |
| | | | 290/55 |
| 2007/0009728 A1* | 1/2007 | Aoki | B64F 1/26 |
| | | | 428/304.4 |
| 2007/0276601 A1* | 11/2007 | Parfitt | G01L 5/133 |
| | | | 702/1 |
| 2011/0133460 A1* | 6/2011 | Cucci | F03D 3/02 |
| | | | 290/44 |
| 2011/0318167 A1* | 12/2011 | Miller | F03D 3/002 |
| | | | 415/121.2 |
| 2012/0152007 A1* | 6/2012 | Holmes | G01M 15/14 |
| | | | 73/112.01 |
| 2015/0017005 A1* | 1/2015 | Dousseaud | F01D 9/042 |
| | | | 416/223 A |
| 2015/0226133 A1* | 8/2015 | Minto | F02C 3/34 |
| | | | 60/39.27 |
| 2016/0251964 A1* | 9/2016 | Solorzano | F03D 1/025 |
| | | | 415/121.3 |
| 2016/0281678 A1* | 9/2016 | Davis | F03D 1/04 |

* cited by examiner

TEST BENCH FOR AN AXIAL TURBINE ENGINE WITH A VERTICAL WIND POWER ENGINE

CROSS-REFERENCE TO RELATED APPLICATIONS

This application claims the benefit, under 35 U.S.C. § 119, of BE 2014/0822 filed Nov. 17, 2014, the disclosure of which is incorporated herein by reference in its entirety.

FIELD

The invention relates to a test bench for a turbine engine. More particularly, the invention relates to a test bench for a turbine engine configured for the recovery of energy generated during a test.

BACKGROUND

Patent document WO 2012/171105 A1 discloses a test bench for a turbine engine including an energy utilization system. The system recovers the kinetic energy of a mixture of combustion gas and air moving inside the test bench and transforms this kinetic energy into electricity by means of a wind power engine. The turbine engine is situated in a test chamber and the wind power engine is situated in a tube downstream of the test chamber. The tube is commonly called a "collector tube", in that it collects the combustion gas exiting from the turbine engine. The high speed of the combustion gas in the tube allows a minimum of ambient air to be drawn in around the turbine engine in order to satisfy the required test conditions in terms of minimum air flow in the test chamber. The collector tube in a way plays a role of a pump of the gas mixture with a view to its expulsion, it also prevents localized reversals of the outflow downstream of the turbine engine. The collector tube can in particular be configured to absorb sound waves downstream of the turbine engine. The wind power engine includes blades that have a variable pitch in order to adapt to the different gas mixture flow speeds reached according to the size of the turbine engines under test; it is connected to an alternator/generator in order to generate electricity. This teaching is valuable in that the wind power engine positioned in the collector tube receives a stream of gas mixture that is substantially laminar. Moreover, the tube limits the size of the wind power engine. However, the teaching is limited to tests of turbine engines for which the speed and pressure of the exhaust gas from the turbine engine, modified by the presence of the wind power engine in the tube, always guarantee the minimum drawing-in of test chamber ambient air necessary for the test. Moreover, the position of the wind power engine in the tube receiving a gas mixture of combustion products at high temperature imposes functioning constraints on the wind power engine that increase its cost.

Patent document EP 2 336 507 A1 discloses a test bench for a turbine engine including a turbine intended to recover the kinetic energy of the exhaust gas from the turbine engine. The turbine is placed between a test chamber, upstream, in which the turbine engine is situated, and an exhaust gas expulsion chamber, downstream. The turbine is configured to replace the function of a conventional collector tube, which is generally of a significant length. In particular, the turbine is capable of absorbing sound waves, for example, infrasounds. The turbine rotor on which are mounted the blades, driven in rotation by the kinetic energy of the gas stream, also includes a propeller functioning as a fan so as to balance the air pressures between the test chamber and the expulsion chamber according to the turbine engines under test. This teaching is valuable in that the test bench is substantially compact. However, it is limited to tests of turbine engines for which the exhaust gas temperature does not exceed a threshold critical to the components of the turbine. Moreover, the turbine forms a brake for the outflow of gas downstream of the engine, and localized reversals of the outflow can perturb testing of turbine engines.

SUMMARY

The aim of the invention is to propose a solution for a test bench for a turbine engine remedying at least one disadvantage of the prior art, in particular the abovementioned prior art. More particularly, the aim of the invention is to propose a solution for a test bench for a turbine engine, capable of recovering kinetic energy from the air flow generated by the test of turbine engines of different sizes.

An object of the invention is a test bench for an axial turbine engine, especially for a turbojet, including: a chamber intended to accommodate the turbine engine; a vertical inlet channel connected to the chamber upstream of the turbine engine; a vertical outlet channel connected to the chamber downstream of the turbine engine; and at least one wind power engine capable of converting the kinetic energy of a portion of the gas stream generated by the turbine engine into mechanical energy; wherein the wind power engine or at least one of the wind power engines is situated in the vertical inlet channel and/or the vertical outlet channel. It will be understood, that as used herein, the term "wind power engine" includes "wind power turbine" or "wind generator".

According to various advantageous embodiments of the invention, the test bench includes at least one projection device for projecting water droplets upstream of the wind power engine or of one of the wind power engines.

According to various advantageous embodiments of the invention, the projection device or at least one of the projection devices is placed directly upstream of the corresponding wind power engine, for example, in various instances at a distance of less than 1 m, in various other instances less than 0.5 m, from the wind power engine.

According to various advantageous embodiments of the invention, the projection device or each of the projection devices is configured to increase the density of the gas stream by 10%, for example, in various instances by 20%, in various other instances by 30%.

Advantageously, the increase of the density of the gas stream increases the mass flow in the test bench.

According to various advantageous embodiments of the invention, the wind power engine or at least one of the wind power engines has a vertical axis of rotation.

According to various advantageous embodiments of the invention, a section of the vertical inlet channel and/or of the vertical outlet channel, at wind power engine height, is between 2 m² and 200 m², for example, in various instances between 40 m² and 70 m².

According to various advantageous embodiments of the invention, the test bench includes an elbowed portion connecting the vertical inlet channel to the chamber, the elbow including deflectors for guiding the flow of fresh air from a vertical direction to a horizontal direction, the wind power engine or at least one of the wind power engines being placed at the entrance of the elbow.

According to various advantageous embodiments of the invention, the vertical inlet channel includes, at its entrance, a device capable of guiding the outflow of air in a homogeneous manner from the atmosphere into the inlet channel, the wind power engine or at least one of the wind power engines being placed between the deflectors and the outflow device.

According to various advantageous embodiments of the invention, the wind power engine or at least one of the wind power engines includes blades with variable orientation.

According to various advantageous embodiments of the invention, the wind power engine or at least one of the wind power engines includes systems for converting mechanical energy into electrical energy.

According to various advantageous embodiments of the invention, at least one system for converting mechanical energy into electrical energy includes a control capable of determining the electrical power to convert.

According to various advantageous embodiments of the invention, the test bench includes a collector tube for the gas stream at the outlet of the turbine engine, the collector tube being placed horizontally and including, at its outlet, a diffuser in the vertical outlet channel.

According to various advantageous embodiments of the invention, the vertical outlet channel includes, at its outlet, a noise reducing device, the wind power engine or one of the wind power engines being placed between the diffuser of the collector tube and the noise reducing device.

According to various advantageous embodiments of the invention, the noise reducing device includes acoustic baffles and/or mural acoustic coatings.

According to various advantageous embodiments of the invention, the vertical outlet channel includes mural acoustic coatings and a device for guiding the outflow of gas mixture, the acoustic coatings being situated between the guiding device and the wind power engine or one of the wind power engines.

According to various advantageous embodiments of the invention, the test bench includes several wind power engines in the vertical inlet channel and/or the vertical outlet channel.

According to various advantageous embodiments of the invention, the length of the channel is at least 20 m, e.g., at least 50 m.

A further object of the invention is a process for recovering energy of a test bench for an axial turbine engine, especially for a turbojet, wherein the test bench is according to the invention described herein, the process including the generation of an air flow by the axial turbine engine and the rotation, induced by the air flow, of the wind power engine or at least one of the wind power engines of the test bench, the rotation of the wind power engine or at least one of the wind power engines generating electricity.

The test bench is advantageously configured for testing turbine engines with thrust between 1 T and 70 T.

According to various advantageous embodiments of the invention, the test bench is configured to generate a mass flow of air in the chamber of between 0.1 kg/sec and 3000 kg/sec, e.g., between 200 kg/sec and 1200 kg/sec.

According to various advantageous embodiments of the invention, the speed of rotation of the wind power engine or at least one of the wind power engines is between 50 rpm and 1000 rpm, for example, in various instances between 100 rpm and 500 rpm and the air flow at the wind power engine or engines has a speed between 5 m/sec and 20 m/sec.

According to various advantageous embodiments of the invention, the device or at least one of the devices for projecting droplets of water is configured such that the relative humidity "e" of the air downstream of the device or devices is between 95% and 100%, for example, in various instances between 99.9% and 100%.

According to various advantageous embodiments of the invention, the water is projected in at least one of the vertical inlet and outlet channels in the form of a water mist and over a portion of more than 50%, e.g., more than 80% of the section of the channel or channels.

According to various advantageous embodiments of the invention, the device or at least one of the devices for projecting water is intended to produce a flow of water of up to 150 kg/sec, for example, in various instances a flow of water of between 2 kg/sec and 40 kg/sec.

According to various advantageous embodiments of the invention, the wind power engine or at least one of the wind power engines is capable of producing electrical power between 0.5 MW and 15 MW, e.g., between 0.8 MW and 5 MW.

A further object of the invention is a functioning process of a test bench for an axial turbine engine, especially for a turbojet, wherein the test bench is according to the invention described herein, the wind power engine or at least one of the wind power engines being configured to function as a fan so as to increase the air flow in the test bench.

The measures of the invention are valuable in that the test bench for an axial turbine engine is capable of recovering as electricity the kinetic energy of the air flow generated in the bench by testing varied types of turbine engine. In fact, the wind power engine positioned in a vertical channel at the inlet and/or at the outlet of the test bench is detached from the areas around the turbine engine, especially downstream and at the periphery, areas in which the speeds of movement of air are high and their modification critical to the quality of the test conditions. The speed of the air in the vertical channels is furthermore lower relative to that in the areas around the turbine engine, and the wind power engines, configured to start rotating in such air speed conditions, are capable of generating an appropriate electrical power. The air flow is moreover substantially laminar in the vertical channels, which is favourable to the efficiency of the energy recovery.

DRAWINGS

Other characteristics and advantages of this invention will be better understood with the help of the description and drawings.

DETAILED DESCRIPTION

Figure 1:
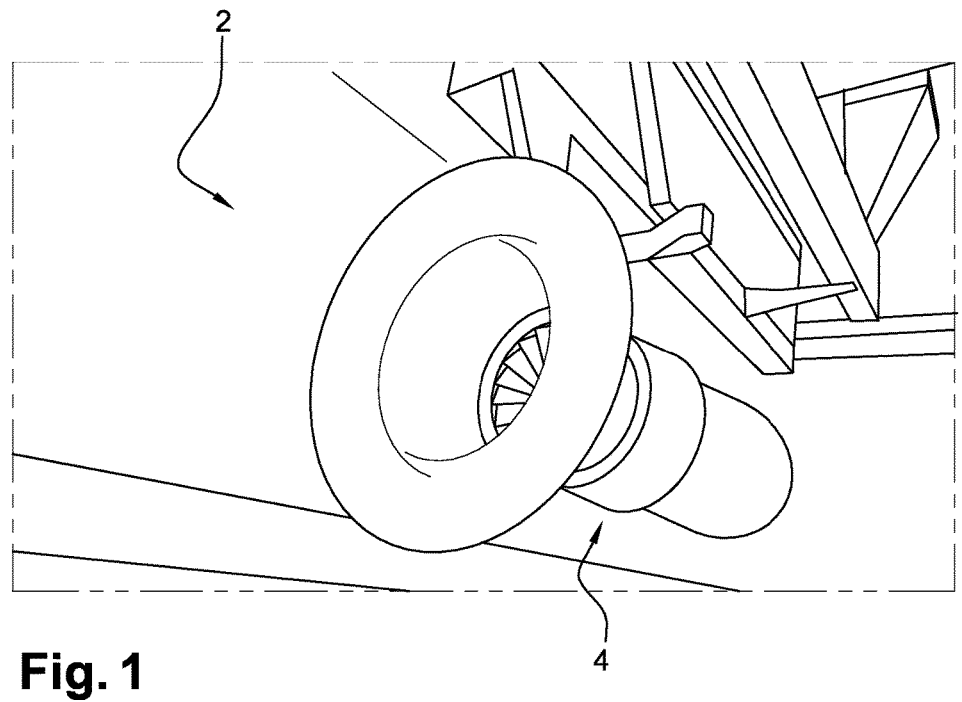
FIG. 1 is a view of the interior of a test bench in which an axial turbine engine is mounted, according to various embodiments of the invention.

FIG. 1 is a view of the interior of a test bench 2 according to the invention, in which test bench an axial turbine engine 4 is mounted. The turbine engine 4 in this case is an aircraft turbojet. The turbojet 4 is capable, according to type, of producing a thrust of 1 T to 70 T. The turbojet 4 passes to the test bench 2 in varied circumstances: the turbojet 4 can be passed to the test bench 2 as part of a new development or for quality control following manufacture or further for maintenance. For these different types of test, the turbojet 4 generates a movement of air, the mass and speed of which produce kinetic energy. A portion of this kinetic energy is intended, within the framework of the invention, to be recovered. For testing such turbojets 4, the test bench 2 is configured to generate a mass flow of air between 0.1 kg/sec and 3000 kg/sec, for example, in various instances between 200 kg/sec and 1200 kg/sec.

Figure 2:
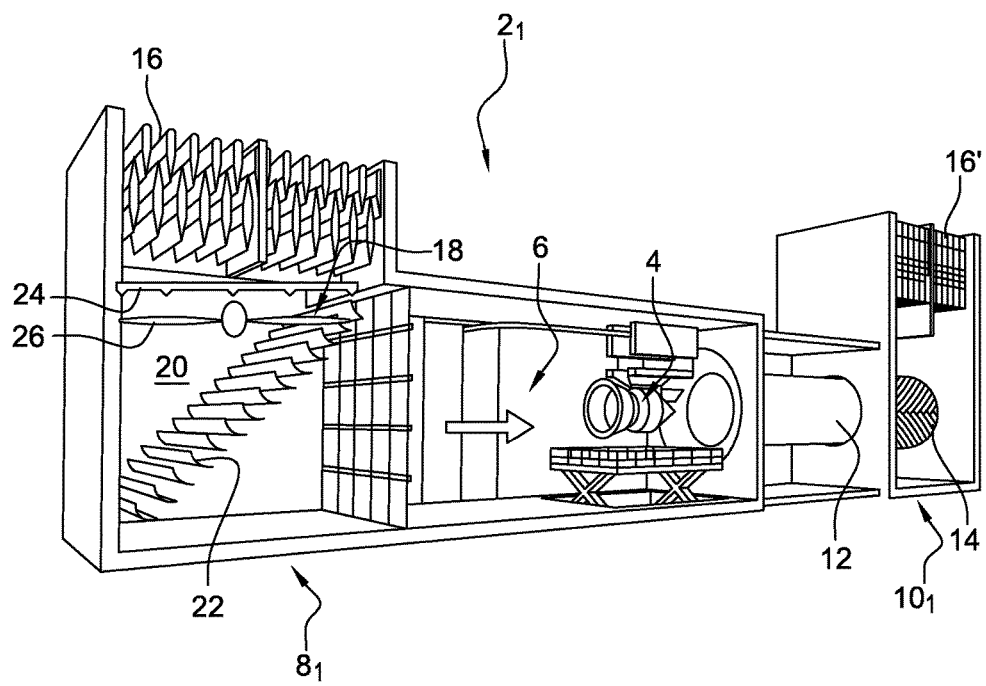
FIG. 2 is a perspective view of the test bench of FIG. 1, according to various embodiments of the invention.
Figure 3:
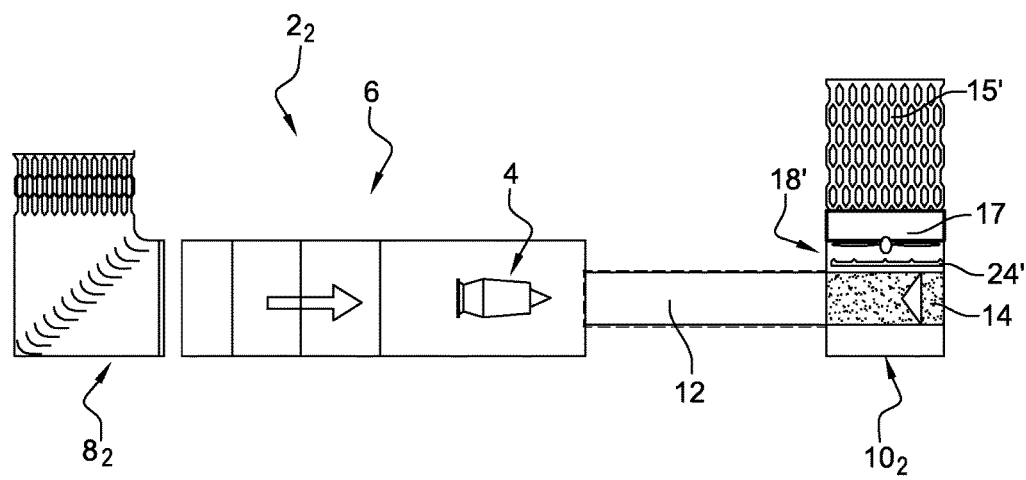
FIG. 3 is a simplified sectional view of a test bench, according to various other embodiments of the invention.
Figure 4:
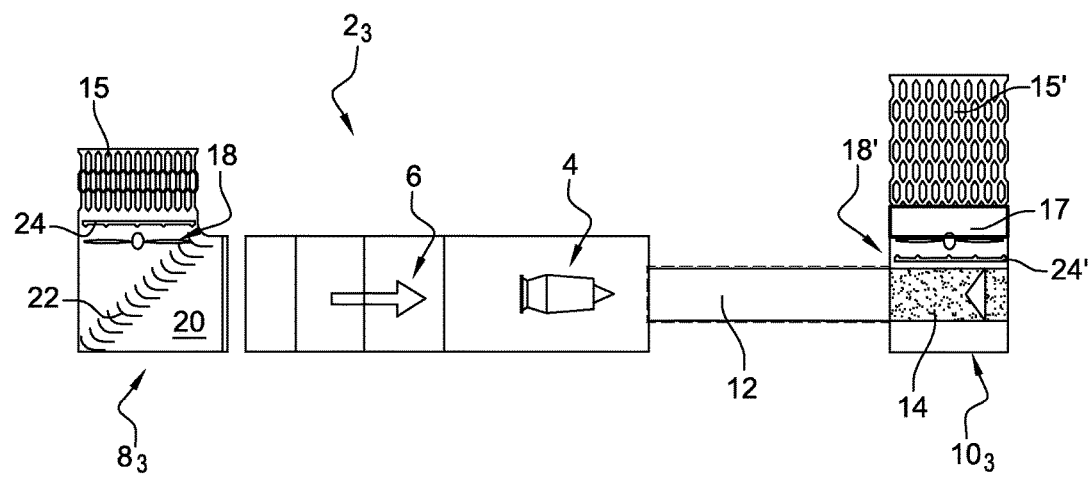
FIG. 4 is a simplified sectional view of a test bench, according to yet various other embodiments of the invention.

FIGS. 2, 3 and 4 are views of test benches $2_1$, $2_2$ and $2_3$ according to various embodiments of the invention, e.g., in first exemplary embodiment, a second exemplary embodiment, and third exemplary embodiment, respectively. The test benches $2_1$, $2_2$ and $2_3$ include a test chamber 6, in which the turbojet 4 is mounted. A vertical inlet channel $8_1$, $8_2$ and $8_3$ is connected to the chamber 6 upstream of the turbojet 4, and a vertical outlet channel $10_1$, $10_2$ and $10_3$ connected to the chamber 6 downstream of the turbojet 4. The section of the vertical inlet $8_1$, $8_2$ and $8_3$ and outlet $10_1$, $10_2$ and $10_3$ channels is between 2 m$^2$ and 200 m$^2$, for example, in various instances between 40 m$^2$ and 70 m$^2$. The inlet $8_1$, $8_2$ and $8_3$ and outlet $10_1$, $10_2$ and $10_3$ channels in this case are square in section. The test benches $2_1$, $2_2$ and $2_3$ also include a collector tube 12 for the gas stream produced by the test downstream of the turbojet 4. The collector tube 12 is placed horizontally and includes at its outlet a diffuser 14 in the vertical outlet channel $10_1$, $10_2$ and $10_3$. The collector tube 12 is furthermore configured to absorb the noise produced by the test. The test benches $2_1$, $2_2$ and $2_3$ moreover include a wind power engine 18 and 18' situated in the vertical inlet channel $8_1$ and $8_3$ and/or in the vertical outlet channel $10_2$ and $10_3$. In an alternative embodiment (not shown), the test bench according to the invention can include several wind power engines in the vertical inlet channel and/or in the vertical outlet channel.

The term "wind power engine" is a term commonly used to designate a wind power turbine or wind generator, intended to convert mechanical energy to electrical energy. The "wind power engine" can also be understood to be a fan intended to generate an air flow, in this case by transforming electrical energy into mechanical energy.

The process according to the invention implemented by the test benches $2_1$, $2_2$ and $2_3$ is that of recovering the kinetic energy of the air flow produced during a test of the turbojet 4, the recovery being achieved by the rotation, produced by the air flow, of the wind power engine or wind power engines, which generate(s) electricity. Another process according to the invention and implemented by the test benches $2_1$, $2_2$ and $2_3$ is that of producing a surplus air flow in the test benches $2_1$, $2_2$ and $2_3$, by means of the wind power engine or wind power engines functioning as fans.

The configuration of the test bench according to the invention and exemplarily presented in connection with FIG. 1 is applicable for the test benches $2_1$, $2_2$ and $2_3$.

FIG. 2 is a perspective view of a test bench $2_1$ according to the invention and in a first exemplary embodiment. The test bench $2_1$ includes a wind power engine 18 situated in the vertical inlet channel $8_1$ and structured and operable to convert to mechanical energy the kinetic energy of a portion of the gas stream generated by the test of the turbojet 4 in the bench and passing through the vertical inlet channel $8_1$. It can be observed that the orientation of the wind power engine 18 is in a vertical axis, it is situated precisely in an elbowed portion 20 of the test bench $2_1$, this portion connecting the vertical inlet channel $8_1$ to the chamber 6. Deflectors 22 are situated in the elbow 20 to guide, in the direction of the chamber 6, the flow of fresh air from a vertical axis to a horizontal axis. An arrow is shown in the test bench $2_1$ to illustrate the direction of movement of the air. The wind power engine 18 is situated at the entrance of the elbowed portion 20 of the test bench $2_1$. In the embodiment presented here, the vertical inlet channel $8_1$ includes a noise reducing device 16, in this case, acoustic baffles, the wind power engine 18 being situated between the acoustic baffles 16 and the deflectors 22. The vertical inlet channel $8_1$ includes in this case several rows of acoustic baffles 16. The vertical outlet channel $10_1$ also includes acoustic baffles 16', a wind power engine 18 can be placed between the acoustic baffles 16' and the diffuser 14. The test bench $2_1$ furthermore includes a device 24 for projecting droplets of water, placed directly upstream of the wind power engine 18, for example, in various instances at a distance of less than 1 m, e.g., less than 0.5 m, from the wind power engine 18. This projection device 24 is configured to increase the density of the air flow. The density of the air flow can be increased by 10%, for example, in various instances by 20%, and in various other instances by 30%. The water is advantageously projected in the form of a water mist, the projection being achieved over a portion of more than 50%, in various instances more than 80%, of the section of the vertical inlet channel $8_1$. The flow of water projected into the vertical inlet channel $8_1$ is adjusted such that the relative humidity of the air downstream of the projection device can be more than 95%, for example, in various instances more than 99.9%. The water projection device 24 is intended to produce a flow of water of up to 150 kg/sec, in various instances a flow of water between 2 kg/sec and 40 kg/sec. This measure is valuable in that the increase of the density of the mass of air moving in the test bench increases its kinetic energy. The increase of the kinetic energy of the air is advantageous for the recovery of energy, its high relative humidity is moreover favourable to the efficiency of the turbojet.

The wind power engine 18 includes blades 26 having variable orientation, modification of the orientation of the blades 26 allowing modification of the speed of rotation of the wind power engine 18. The speed of rotation of the wind power engine is between 50 rpm and 1000 rpm, for example, in various instances between 100 rpm and 500 rpm and the air flow at the wind power engine 18 has a speed between 5 m/sec and 20 m/sec. This measure is valuable in that the adjustment of the orientation of the blades 26 of the wind power engine 18 allows the creation of a speed of rotation of the wind power engine 18 appropriate to the efficiency of energy recovery. The wind power engine 18 furthermore includes systems (not shown) for converting mechanical energy into electrical energy, these systems being able to include a control (not shown) determining the electrical power to convert. The wind power engine 18 is configured to recover an electrical power between 1 MW and 15 MW.

FIG. 3 is a simplified sectional view of a test bench $2_2$ according to the invention and in a second exemplary embodiment. Unlike the first embodiment presented in connection with FIG. 2, the test bench $2_2$ includes a wind power engine 18' situated in the vertical outlet channel $10_2$ downstream of the turbojet 4. The vertical outlet channel $10_2$ in this embodiment includes a device 15' capable of guiding the outflow of the gas mixture in a homogeneous manner from the vertical outlet channel $10_2$ to the atmosphere. It can be observed that the wind power engine 18' is placed between the diffuser 14 and the device 15'. The device 15' prevents the formation of localized reversals of outflow downstream of the wind power engine. This measure is valuable for reducing the sensitivity of the test bench $2_2$, for example to an outside wind, and for favouring the efficiency of energy recovery. Furthermore, the vertical outlet channel $10_2$ includes mural acoustic coatings 17 situated between the device 15' for guiding the outflow of the gas mixture and the wind power engine 18'. The axis of rotation of the wind power engine 18' is vertical. A device 24' for projecting water can be observed, situated upstream of the wind power engine 18' and allowing the density of the gas mixture to be increased as seen in connection with FIG. 2.

The water mist produced increases the mass flow of the gas mixture. The gas mixture can advantageously reach a relative humidity of 100% downstream of the device 24' for projecting water. The temperature of the gas mixture at the vertical outlet channel 10$_2$ is moreover higher than that at the entrance to the test bench, e.g., it can be above 50° C. This measure is valuable in that the expansion of the gas mixture, associated with the temperature, increases its speed. The increase of the density of the gas mixture added to this increase in speed is favourable to the increase of the kinetic energy of the gas mixture. The characteristics of the wind power engine 18' are moreover identical to those of the wind power engine seen in connection with FIG. 2, the wind power engine 18' is capable of recovering an electrical power between 1 MW and 15 MW.

FIG. 4 is a simplified sectional view of a test bench 2$_3$ according to the invention and in a third exemplary embodiment. It can be observed that a first wind power engine 18 is situated in the vertical inlet channel 8$_3$ as presented in connection with FIG. 2, and that a second wind power engine 18' is situated in the vertical outlet channel 10$_3$ as presented in connection with FIG. 3. The wind power engines 18 and 18' include devices 24 and 24' for projecting water as presented in connection with FIGS. 2 and 3. It can be observed that the vertical inlet channel 8$_3$ includes a device 15 capable of guiding the outflow of air in a homogeneous manner from the atmosphere into the vertical inlet channel 8$_3$. This measure favours the laminar outflow of the air in the test bench 2$_3$ upstream of the wind power engine 18. The wind power engine 18 is placed between the device 15 and the deflectors 22. It is also possible, in the vertical outlet channel 10$_3$, to see a device 15' capable of guiding the outflow of gas mixture, together with mural acoustic coatings 17, as presented in connection with FIG. 3.

What is claimed is:

1. A test bench for an axial turbine engine, said test bench comprising:
   a chamber structured and operable to accommodate a turbine engine;
   a vertical inlet channel connected to the chamber upstream of the turbine engine;
   a vertical outlet channel connected to the chamber downstream of the turbine engine;
   at least one wind power engine including a system structured and operable to convert mechanical energy of the wind power engine into electrical energy, wherein the at least one wind power engine is disposed in the vertical inlet channel, and
   an elbowed portion connecting the vertical inlet channel to the chamber, the elbow including deflectors for guiding the flow of fresh air from a vertical direction to a horizontal direction, the at least one wind power engine being placed at the entrance of the elbow, upstream of the deflectors, such that the air flows through the wind power engine first, then through the deflectors and then reaches the chamber of the turbine engine,
   wherein the at least one wind power engine has a vertical axis of rotation, and the respective system for converting mechanical energy to electrical energy is disposed in the vertical inlet channel.

2. The test bench in accordance with claim 1, wherein a section of at least one of the vertical inlet and outlet channels, at a wind power engine height, is between 2 m$^2$ and 200 m$^2$.

3. The test bench in accordance with claim 1, wherein the at least one wind power engine includes blades with variable orientation.

4. The test bench in accordance with claim 1, wherein the system for converting mechanical energy to electrical energy is structured and operable to function as a fan so as to increase the air flow in the test bench.

5. The test bench in accordance with claim 1, wherein at least one vertical inlet and outlet channels with the at least one wind power engine forms a closed loop around the respective wind power engine.

6. The test bench in accordance with claim 1, further comprising a wind power engine in the vertical outlet channel.

7. A process for recovering energy of a test bench for an axial turbine engine, wherein the test bench includes: a chamber intended to accommodate the turbine engine; a vertical inlet channel connected to the chamber upstream of the turbine engine; a vertical outlet channel connected to the chamber downstream of the turbine engine; and at least one wind power engine including a system structured and operable to convert the mechanical energy of the wind power engine into electrical energy, wherein the at least one wind power engine is situated in the vertical inlet channel, said process comprising:
   generating an air flow by the axial turbine engine; and
   generating electricity by recovering energy from the air flow utilizing the at least one wind power engine and the system structured and operable to convert the mechanical energy of the at least one wind power engine into electrical energy,
   wherein the at least one wind power engine has a vertical axis of rotation, and the respective system for converting mechanical energy to electrical energy is disposed in said vertical inlet channel.

8. The process in accordance with claim 7, wherein the turbine engine comprises a turbojet engine.

9. The process in accordance with claim 7, wherein the speed of rotation of at least one wind power engine is between 50 rpm and 1000 rpm.

10. The process in accordance with claim 7, wherein the system structured and operable to convert the mechanical energy is structured and operable to produce between 1 MW and 15 MW.

11. The process in accordance with claim 7, wherein the test bench further includes at least one device for projecting water droplets upstream of the at least one wind power engine, the at least one projection device configured such that the relative humidity (e) of the air downstream of the at least one projection device is between 95% and 100%.

12. The process in accordance with claim 11, wherein the at least one projection device is structured and operable to increase the density of the gas stream by at least 10%.

13. A test bench for an axial turbine engine, said test bench comprising:
   a chamber structured and operable to accommodate a turbine engine;
   a vertical inlet channel connected to the chamber upstream of the turbine engine;
   a vertical outlet channel connected to the chamber downstream of the turbine engine; and at least one wind power engine including a system structured and operable to convert mechanical energy of the wind power engine into electrical energy, wherein the at least one wind power engine is disposed in the vertical inlet channel, the test bench further comprising a collector tube for a gas stream at the outlet of the turbine engine, the collector tube being placed horizontally and including, at its outlet, a diffuser in the vertical outlet channel, wherein the chamber is separated from the vertical outlet channel and the collector tube structurally connects the chamber and the vertical outlet channel and the collector tube is interposed between the chamber and the vertical outlet channel.

14. The test bench in accordance with claim 13, wherein the vertical outlet channel includes, at its outlet, a noise reducing device, the at least one wind power engine being placed between the diffuser of the collector tube and the noise reducing device.

\* \* \* \* \*